J. M. LAYTON & H. G. HAWORTH.
RESILIENT STAIRWAY CLIMBING VEHICLE.
APPLICATION FILED SEPT. 30, 1915.
1,261,944.
Patented Apr. 9, 1918.
2 SHEETS—SHEET 2.
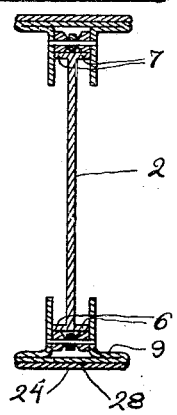
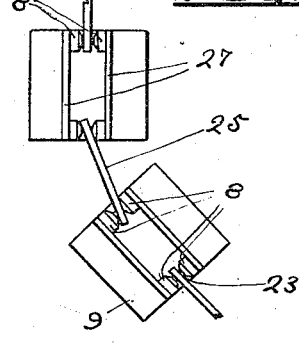
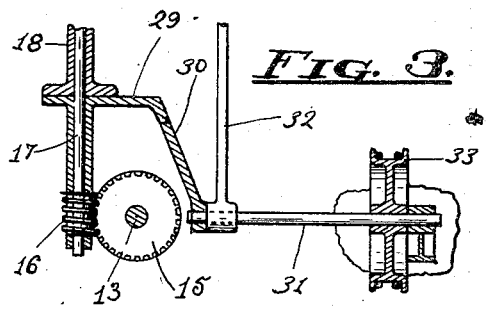
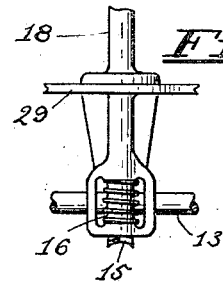
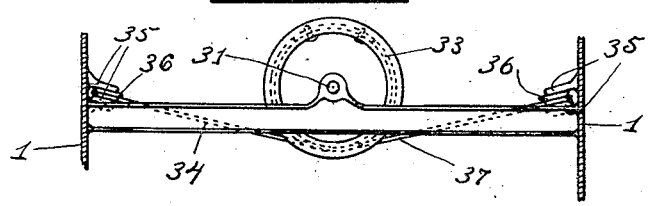
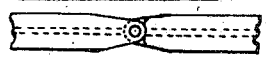
Witness
Marvin B. Davis.
Gertrude M. Davis.
Inventors
Henry G. Haworth
& John M. Layton,
By
Wm F. Davis
Attorney.

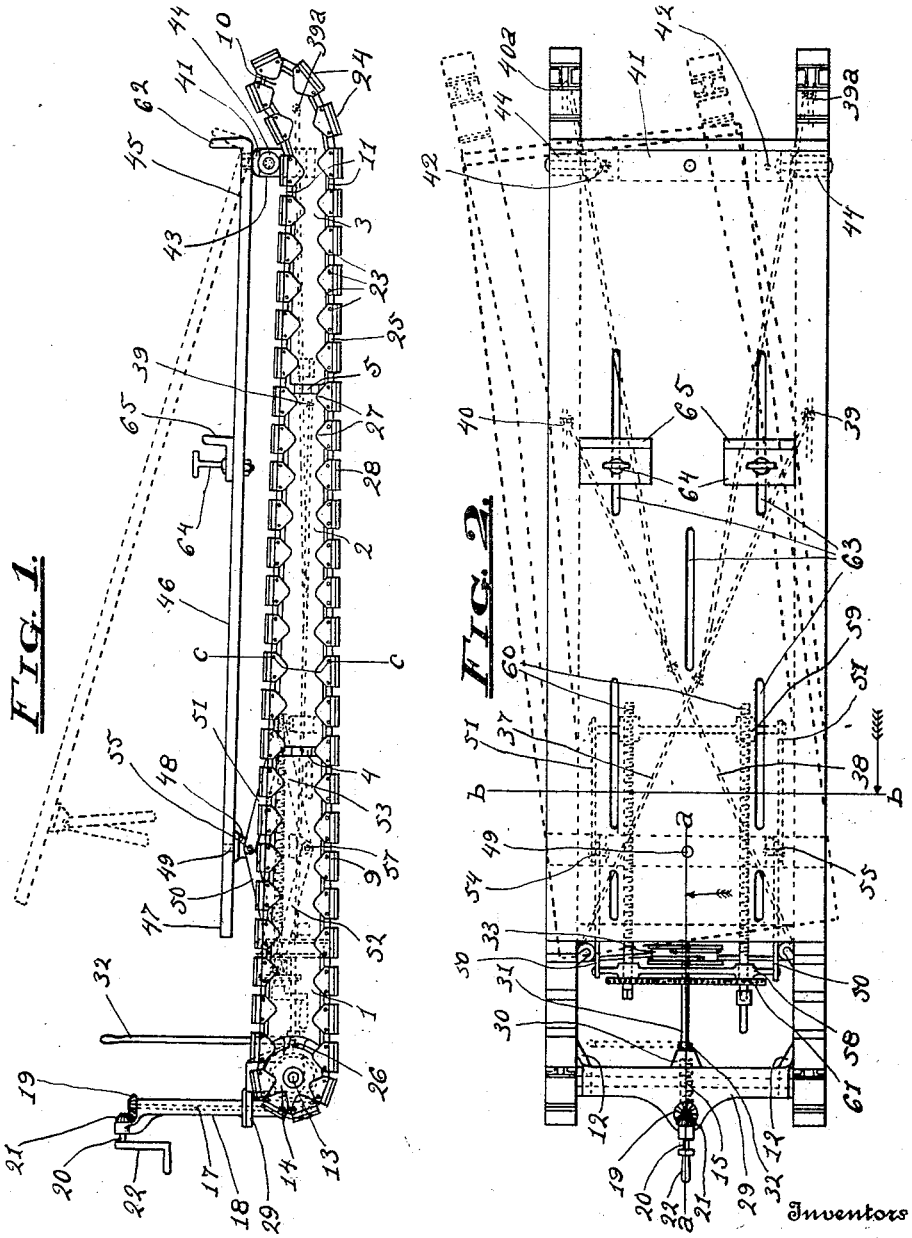

UNITED STATES PATENT OFFICE.

JOHN MICAJAH LAYTON AND HENRY GREEN HAWORTH, OF LEAVENWORTH, KANSAS, ASSIGNORS OF TWO-THIRDS TO BENJAMIN F. SAMUELS, OF LEAVENWORTH, KANSAS, AND ONE-THIRD TO SAID HAWORTH.

RESILIENT STAIRWAY-CLIMBING VEHICLE.

1,261,944.   Specification of Letters Patent.   Patented Apr. 9, 1918.

Application filed September 30, 1915. Serial No. 53,326.

*To all whom it may concern:*

Be it known that we, JOHN M. LAYTON and HENRY G. HAWORTH, citizens of the United States, residing at Leavenworth, in the county of Leavenworth and State of Kansas, have invented certain new and useful Improvements in Resilient Stairway-Climbing Vehicles, of which the following is a full, clear, and exact description, such as will enable others skilled in the art to which it appertains to make and use the same.

The invention relates to stairway climbing vehicles for moving pianos, furniture, glass ware, breakable articles and invalids without shock or jar.

Furniture and many breakable articles as well as invalids often require moving up and down steps and stairways and over rough and uneven surfaces and heretofore this has been accomplished by individuals lifting and carrying the article or invalid solely by muscular exertion.

The present invention seeks to provide an improved resilient supported vehicle that will travel smoothly over rough and uneven surfaces, and ascend and descend steps and stairways, and turn curves and corners and follow winding stairways without the slightest shock or jar to the load carried by the truck.

A further object of the invention is to support the truck on tread blocks that will not injure or mar the most finely finished floor or stairway.

With these and other objects in view the invention consists in the improved features of construction, shapes, combinations and arrangements of parts hereinafter set forth and more particularly pointed out in the appended claims, the accompanying drawing illustrating an application of the invention.

In the drawings:—

Figure 1 is a view of the improved vehicle in side elevation.

Fig. 2 is a plan view of the vehicle.

Fig. 3 is an enlarged fragmentary sectional view on line *a—a* of Fig. 2.

Fig. 4 is an enlarged fragmentary view in end elevation.

Fig. 5 is an enlarged fragmentary sectional view on line *b—b* of Fig. 2.

Figs. 6, 7 and 8 are still further enlarged, Fig. 6 being a fragmentary sectional view of the frame and tread blocks taken on line *c—c* of Fig. 1, while Fig. 7 is a fragmentary view of the tread blocks and chain, and Fig. 8 is a fragmentary plan view of the frame.

The side frames are practically duplicate excepting as to the projection of connections in which respect they are practically opposite and comprise rear sections 1, intermediate sections 2 and front sections 3, the sections 1 and 2 being hinged together at 4, while the sections 2 and 3 are hinged at 5, so that the frames have sufficient strength to support any load the vehicle is intended to carry with either frame resting in but one or two places on the surface over which the vehicle travels.

The hinges are for the purpose of allowing the sections 2 and 3 to be turned from alinement with the section 1 for the purpose of guiding the vehicle and turning corners as will hereinafter be more fully explained.

The sections 1 and 2 are provided with flanges 6 and 7 to secure width of bearing for the rollers 8 of the tread blocks 9, the section 3 being curved upward at the front end 10 and having the flange 11 extending along both edges thereof and around the upturned portion, the end 10 being curved upward for the purpose of climbing over obstruction and to aid the vehicle in starting to climb a stairway, the upward incline being sufficient to reach over the lower step of a stairway when the main portion of the truck is horizontal.

From the inner side of sections 1 extend rearwardly arms 12 in which is journaled the shaft 13, on which is rigidly mounted the sprocket wheels 14, the shaft 13 also having rigidly mounted thereon the worm wheel 15 in which meshes the worm 16, the latter mounted on the vertical shaft 17, the vertical shaft being journaled in the housing 18 and having mounted on the upper end thereof, the miter gear 19, the shaft 20 being also journaled in the housing 18 and having mounted thereon the miter gear 21 meshing with the gear 19, the crank 22 being secured to the shaft 20, so that by turning the crank the sprocket wheels will be rotated.

The sprocket wheels 14 are each practically in alinement with the respective side frame 1, and the tread chain comprising rollers 8, tread blocks 9, pins 23, cushions 24 and links 25 surrounds the side frame and the sprocket wheel, the teeth 26 of the sprocket 14 fitting between the flanges 27 of the tread blocks and between alternate pairs of links 25 and alternate double pairs of rollers 8, the rollers being positioned to traverse the flanges 6, 7 and 11, and hold the tread blocks from frictional contact with the flanges, excepting that flanges 27 are allowed to contact therewith for the purpose of guiding the tread chain, the entire weight placed upon the vehicle being supported by the rollers 8.

Secured to the tread face 28 of each tread block 9, is the cushion 24 preferably of rubber or like material, the purpose of the cushion being to prevent slippage of the vehicle on any smooth surface and on an incline as a stairway, and also to prevent shock or jar from contact with any abrupt object, it being understood that the entire vehicle may rest on three cushions when the surface underneath the truck is such that not more than three points thereof may contact with the cushions, also as the vehicle engages the initial step of a stairway leading from the level the entire vehicle will rest on not more than four cushions, one on either side engaging the step and one on either side supporting the opposite end of the vehicle.

From the foregoing it will be understood that when the crank 22 is turned and the miter gears 20 and 21, and worm 16 and worm wheel 15, and sprockets 14 revolve, the tread chain will travel around the side frames and by reason of the cushion 24 preventing the slippage of the chain on the surface supporting the same, the vehicle will travel in the direction that the sprocket wheels 14 are revolved.

The cushions 24 have a still further advantage in climbing stairways of making resilient contact with the corners of steps, adding smoothness to the travel of the vehicle and protecting the steps from becoming marred or injured, it being understood that the truck may descend a stairway as easily as to ascend.

The housing 18 is rigidly secured to the transverse connecting member 29 which is preferably integral with arms 12 and sections 1 of the side frames, the arm 30 extending from the member 29 downward and toward the opposite end of the vehicle and having journaled therein, the shaft 31 on which is mounted the steering lever 32 and the winding drum 33, the end of the shaft 31 opposite the arm 30 being journaled in the transverse connecting member 34 also preferably integral with the sections 1. Extending from either of the sections 1 are bifurcated jaws 35 between which are journaled the rope pulleys 36, the ropes 37 and 38 each being wound upon the drum and threaded over the corresponding pulley 36, the respective ends of the ropes being attached to the side frames at the point designated as 39 and 39ª, and 40 and 40ª respectively.

The ropes 37 and 38 are so adjusted that when the steering lever 32 is in the upward position as shown in full lines of Figs. 1 and 2 the frame sections 2 and 3 will be in alinement with the frame section 1 as shown in full lines of Fig. 2, and when the lever 32 is shifted to the position of the dotted lines of Fig. 2 the frames 2 and 3 will be drawn to the curved position as shown by the dotted lines of the frames in Fig. 2, it being obvious that if the lever is shifted in the opposite direction the frames will be thrown in the corresponding direction, the flanges 6, 7 and 11 being partly removed near the hinges 4 and 5 as shown in Fig. 8 enlarged view so that the flanges 27 of the tread blocks 9 may traverse the flanges when the frame is thrown out of alinement.

From the foregoing it will be understood that the vehicle may be steered and guided by the lever 32 and that the tread chain will traverse the flanges 6, 7 and 11 when the frames are in curved position as well as when the frames are in alinement, so that the vehicle may be directed in any desired position such as turning corners and ascending and descending winding stairways.

Connecting the side frame sections 3 is the traverse member 41 pivoted at 42 to the arms 43, the latter being integral with the respective sections 3, the rollers 44 being journaled on the member 41 and positioned to hold the tread chain upon frame section 3 so that the chain will follow the curvature of the end 10 of the frames.

Resting on the traverse member 41 and pivoted thereto at 42 is the front end 45 of the table 46, the opposite or rear end 47 of the table being adjustably supported by the traverse bar 48 pivoted to the table at 49, and by upper toggle arms 50 and 51, and lower toggle arms 52 and 53, the arms 50 and 51 being pivoted to the traverse bar 48 at 54 and 55, while the arms 52 and 53 are pivoted to the side frame sections 1 at 56 and 57, the upper rear toggle arms 50 and lower rear toggle arms 52 being pivotally connected by the traverse member 58, while the upper front toggle arms 51 and lower front toggle arms 53 are pivotally connected by the traverse member 59.

Journaled and shouldered in the traverse member 58 in the usual manner, and screw threaded in the traverse member 59, are the screws 60 to each of which is rigidly secured a sprocket wheel of common and well known construction, the wheels not being in view because of being covered by the chain 61, the chain connecting the screws in common manner so that the turning of either screw will turn the remaining one.

The table 46 is shown in full lines in lowered position and in dotted lines in raised position, it being well known that when the table is in lowered position it may be raised by turning the screws and bringing the members 58 and 59 toward each other, and bringing the toggle arms to vertical folding position as shown in dotted lines instead of horizontal folding position as shown in full lines. The main object of elevating the table as shown or to any desired angle is to preserve a level position thereof when the truck is ascending or descending a stairway or other incline, it being obvious that the table may be gradually elevated as the truck assumes the angle of the incline or stairway, and the table may be maintained at all times in a horizontal position, it being very desirable to maintain many articles of furniture on a level surface while moving them, also in moving invalids up or down stairways it is very desirable to maintain a level position of the table, it being understood that beds or chairs may be placed on the table to receive the invalid.

The front end 45 of the table 46 is provided with an upwardly turned ledge or end board 62 as a rest or stop to prevent articles from slipping over and off from the table, while slots 63 are provided at intervals for the insertion of the lock bolts 64, so that the jaws 65 may be locked in any desired position longitudinally of the table, it being obvious that the article of furniture or the like may be placed against the ledge 62 and one or more of the jaws 65 placed snugly against the article and locked by the bolt or bolts 64 so that no slippage on the table will occur, it will also be understood that the article may be secured in any position on the table by two or more of the jaws 65, and that more than two of the jaws may be employed when desired.

From the foregoing description it will be understood that articles of merchandise, or furniture, or chairs or beds to hold invalids may be secured on the table 46 and the latter adjusted to correspond to the surface on which the truck may rest, and that by turning the crank 22 the truck will travel on the level or up on a stairway, or an incline, also that by turning the steering lever 32 from side to side the truck may be compelled to travel where desired.

The improved vehicle is of chief importance for the moving of pianos, breakable merchandise and invalids between floors that are connected only by stairways, but it may also be employed as a general utility truck where ease in handling and resiliency of movement are essential. It is obvious that numerous changes may be made in the details as set forth without departure from the essentials of the invention.

What we claim as new, and desire to secure by Letters Patent, is:—

1. In a stair climbing vehicle, a pair of frames, each of said frames formed of sections pivotally connected to swing horizontally, a shaft journaled transversely in said frames and near one end thereof, a sprocket wheel mounted on said shaft near each end thereof and in alinement with the respective frame, the sections of said frame adjacent said sprocket wheels rigidly connected transversely, means to revolve said shaft and sprocket wheels, means to throw the free end of said frames from side to side for steering purposes, and a tread chain surrounding each of said sprocket wheels and the companion frame.

2. In a stair climbing vehicle, a pair of frames, each of said frames formed of sections pivotally connected to swing horizontally, a sprocket wheel journaled through suitable connections to one end of each of said frames, said sprocket wheels located at companion ends of said frames, a chain surrounding each of said sprocket wheels and the companion frame, and means to steer said frames.

3. In a stair climbing vehicle, a pair of frames, each of said frames, formed of sections pivotally connected to swing horizontally, a sprocket wheel journaled through suitable connections to one end of each of said frames, said sprocket wheels located at companion ends of said frames, a chain surrounding each of said sprocket wheels and the companion frame, said frames and said sprockets forming a continuous bearing for said chains and controlling means to steer said frames.

4. In a stair climbing vehicle, a pair of frames, each of said frames formed of sections pivotally connected to swing horizontally, a sprocket wheel journaled through suitable connections to one end of each of said frames, said sprocket wheels located at companion ends of said frames, a chain surrounding each of said sprocket wheels and the companion frame, and means by which said sprocket wheels can be rotated.

5. In a stair climbing vehicle, a pair of frames, each of said frames formed of sections pivotally connected to swing horizontally, a sprocket wheel journaled through suitable connections to one end of each of said frames, said sprocket wheels located at companion ends of said frames, a chain surrounding each of said sprocket wheels and the companion frame, and means mounted on said frames to receive and retain movable articles as furniture and the like.

In testimony whereof we affix our signatures in the presence of two witnesses.

JOHN MICAJAH LAYTON.
HENRY GREEN HAWORTH.

Witnesses:
W. Brodie,
R. A. Miller.